US008144089B2

(12) United States Patent
Shin et al.

(10) Patent No.: US 8,144,089 B2
(45) Date of Patent: Mar. 27, 2012

(54) LIQUID CRYSTAL DISPLAY DEVICE AND DRIVING METHOD THEREOF

(75) Inventors: Hyung Beom Shin, Daegu-si (KR); Hong Sik Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 824 days.

(21) Appl. No.: 11/448,109

(22) Filed: Jun. 7, 2006

(65) Prior Publication Data

US 2007/0152936 A1 Jul. 5, 2007

(30) Foreign Application Priority Data

Dec. 30, 2005 (KR) ........................ 10-2005-0134661

(51) Int. Cl.

| | |
|---|---|
| ***G09G 3/36*** | (2006.01) |
| ***G09G 5/00*** | (2006.01) |
| ***G09G 3/18*** | (2006.01) |
| ***G06F 3/038*** | (2006.01) |

(52) U.S. Cl. ............................ 345/87; 345/50; 345/204

(58) Field of Classification Search .............. 345/50–51, 345/87–92, 204–206

See application file for complete search history.

(56) References Cited

U.S. PATENT DOCUMENTS

| | | | | |
|---|---|---|---|---|
| 6,031,514 | A * | 2/2000 | Hashimoto et al. | 345/94 |
| 6,683,591 | B2 * | 1/2004 | Hashimoto et al. | 345/87 |
| 6,853,364 | B2 * | 2/2005 | Kai et al. | 345/100 |
| 7,545,356 | B2 * | 6/2009 | HoeSup | 345/94 |
| 2003/0227431 | A1 * | 12/2003 | Chung et al. | 345/98 |
| 2004/0178977 | A1 * | 9/2004 | Nakayoshi et al. | 345/87 |
| 2004/0239667 | A1 * | 12/2004 | Takahashi | 345/212 |
| 2005/0052371 | A1 * | 3/2005 | Ozawa | 345/76 |
| 2005/0083279 | A1 * | 4/2005 | Lee et al. | 345/87 |
| 2006/0208985 | A1 * | 9/2006 | Hwang et al. | 345/92 |
| 2006/0284811 | A1 * | 12/2006 | Huang | 345/92 |
| 2006/0290863 | A1 * | 12/2006 | HoeSup | 349/141 |
| 2007/0262938 | A1 * | 11/2007 | Kim | 345/92 |
| 2007/0296658 | A1 * | 12/2007 | Kim | 345/87 |
| 2008/0117148 | A1 * | 5/2008 | Tu | 345/87 |
| 2008/0238853 | A1 * | 10/2008 | Tu et al. | 345/98 |
| 2009/0109390 | A1 * | 4/2009 | Lin | 349/139 |

FOREIGN PATENT DOCUMENTS

JP 2001133808 A * 5/2001

* cited by examiner

*Primary Examiner* — Bipin Shalwala
*Assistant Examiner* — Matthew Fry
(74) *Attorney, Agent, or Firm* — McKenna Long & Aldridge LLP

(57) ABSTRACT

A liquid crystal display device is divided into a display region and a non-display region. A first thin film transistor is formed in each pixel region of the display region, and a second thin film transistor is formed in the non-display region. The first thin film transistor is a switch for controlling the supply of a data voltage to the pixel region, and the second thin film transistor is a switch for controlling the supply of a common voltage to the pixel region. The first thin film transistor has the same parasitic capacitance as that of the second thin film transistor. Accordingly, the flicker or image-sticking can be prevented. Also, the aperture ratio of each pixel region can be improved.

9 Claims, 3 Drawing Sheets

LIQUID CRYSTAL DISPLAY DEVICE AND DRIVING METHOD THEREOF

This application claims the benefit of Korean Patent Application No. P2005-134661, filed on Dec. 30, 2005, which is hereby incorporated by reference for all purposes as if fully set forth herein.

BACKGROUND OF THE INVENTION

1. Field of the Invention

The present invention relates to a liquid crystal display device, and more particularly, to a liquid crystal display device capable of preventing flicker or image-sticking and a driving method thereof.

2. Discussion of the Related Art

With the development of today's information society, demands for various display devices are increasing. To meet such demands, flat display devices, such as liquid crystal display devices (LCD), plasma display panels (PDP), and electroluminescent displays (ELD), have been developed, and some of them have been widely used.

Most of all, LCDs are lightweight and slim and have low power consumption. Also, LCDs may provide high image quality. Because of these advantages, CRTs have been replaced with LCDs. Such LCDs are widely used for notebook monitors, TV display panels, and so on.

The LCDs display images by controlling light transmittance of liquid crystal.

FIG. 1 is a schematic diagram of a related art LCD.

Referring to FIG. 1, the related art LCD includes a liquid crystal panel 2 in which pixel regions P are arranged in a matrix, a gate driver 4 for driving a plurality of gate lines GL0 to GLn of the liquid crystal panel 2, a data driver 6 for driving a plurality of data lines DL1 to DLm of the liquid crystal panel 2, and a timing controller 8 for controlling the gate driver 4 and the data driver 6.

In the liquid crystal panel 2, the gate lines GL0 to GLn and the data lines DL1 to DLm are arranged and thin film transistors (TFTs) and pixel electrodes (not shown) are formed at the crossings of the gate lines GL1 to GLn and the data lines DL1 to DLm. The pixel electrodes overlap common voltage lines VL1, VL2, . . . arranged in parallel to the gate lines GL1 to GLn, thereby forming storage capacitors Cst.

The gate driver 4 supplies scan signals to the gate lines GL1 to GLn in response to gate control signals generated from the timing controller 8. The data driver 6 supplies data voltages to the data lines DL1 to DLm in response to data control signals generated from the timing controller 8.

The timing controller 8 generates the control signals for controlling the gate driver 4 and the data driver 6 using vertical/horizontal sync signals (Vsync/Hsync), a data enable signal (DE), and a clock signal that are generated from an external system (not shown).

In such an LCD, the gate driver 4 supplies the liquid crystal panel 2 with the scan signals in response to the gate control signal supplied from the timing controller 8, and the data driver 6 supplies the liquid crystal panel 2 with the data voltage in response to the data control signal. Here, gray scale is reflected in the data voltage. Accordingly, the TFTs of the liquid crystal panel 2 are turned on and the data voltages are applied to the pixel electrodes through the turned-on TFTs. Although not shown, a predetermined common voltage is also applied to the common electrodes. Due to the difference between the data voltage and the common voltage, the liquid crystal is oriented and the light transmittance of the liquid crystal is controlled, thereby displaying the images.

When the TFT changes from the turned-on state to the turned-off state as the gate voltage changes from a high voltage (VGH) to a low voltage (VGL), the data voltage (Vd) charged at the pixel electrode is dropped as much as a kickback voltage (ΔVp) due to a parasitic capacitance (Cgs) of the TFT, as shown in FIG. 2.

The kickback voltage (ΔVp) is expressed in Eq. (1) below.

$$\Delta V_p = \frac{C_{gs}}{C_{gs} + C_{st} + C_{1c}}(V_{GH} - V_{GL}) \tag{1}$$

where

ΔVp is a kickback voltage

Cgs is a capacitance between a gate electrode (G) and a source electrode (S) in a TFT;

$C_{st}$ is a storage capacitance;

$C_{lc}$ is a capacitance of a liquid crystal;

$V_{GH}$ is a gate high voltage; and $V_{GL}$ is a gate low voltage.

For example, it will be assumed that a positive data voltage is supplied during a positive polarity period, a negative data voltage is supplied during a negative polarity period, and the positive data voltage and the negative data voltage have the same gray scale. In this case, the positive data voltage during the positive polarity period and the negative data voltage during the negative polarity period are all dropped by the kickback voltage ($\Delta V_p$). Therefore, the difference between the common voltage and the positive data voltage during the positive polarity period is different from that between the common voltage and the negative data voltage during the negative polarity period. That is, different gray scales, not the same gray scales are displayed during the positive polarity period and the negative polarity period. Consequently, flicker and image-sticking occur due to the kickback voltage ($\Delta V_p$) on the liquid crystal panel 2, causing the degradation of the image quality.

SUMMARY OF THE INVENTION

Accordingly, the present invention is directed to an LCD and a driving method thereof that substantially obviate one or more problems due to limitations and disadvantages of the related art.

An advantage of the present invention is to provide an LCD capable of preventing flicker or image-sticking by offsetting a kickback voltage, and a driving method thereof.

Another advantage of the present invention is to provide an LCD capable of increasing an aperture ratio by providing a switch in a non-display region, and a driving method thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described herein, there is provided a liquid crystal display device including a display region in which a plurality of pixel regions are arranged in a matrix, and a non-display region in which no display regions are formed. Each of the pixel regions includes: gate lines and data lines crossing one another; common voltage lines arranged in parallel to the gate lines; first thin film transistors connected to the gate lines and the data lines; pixel electrodes connected to the first thin film transistors; and common electrodes connected to the common voltage lines. The non-display region includes second thin film transistors connected to the gate lines and the common voltage lines.

In another aspect of the present invention, there is provided a liquid crystal display device including: a plurality of gate lines arranged in a first direction; a plurality of data lines arranged in a second direction and crossing the gate lines; a plurality of common voltage lines arranged in parallel to the gate lines; a plurality of first thin film transistors connected to the gate lines and the data lines, respectively; a plurality of pixel electrodes connected to the first thin film transistors, respectively; a plurality of common electrodes connected to the first common voltage lines, respectively; a plurality of second thin film transistors connected to the gate lines, common electrodes, and the first common voltage lines.

In a further aspect of the present invention, there is provided a method for driving a liquid crystal display device, the liquid crystal display device including the liquid crystal display device including a plurality of gate lines arranged in a first direction, a plurality of data lines arranged in a second direction and crossing the gate lines, a plurality of common voltage lines arranged in parallel to the gate lines, a plurality of first thin film transistors connected to the gate lines and the data lines, respectively, a plurality of pixel electrodes connected to the first thin film transistors, respectively, a plurality of common electrodes connected to the first common voltage lines, respectively, and a plurality of second thin film transistors connected to the gate lines and the first common voltage lines, the method including: supplying a scan signal to the gate line; switching the first and second thin film transistors disposed on the gate line according to the scan signal; applying a predetermined data voltage, which is supplied to the data line, through the first thin film transistor to the pixel electrode; and applying a common voltage, which is supplied to the second common voltage line, through the second thin film transistor and the first common voltage line to the common electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
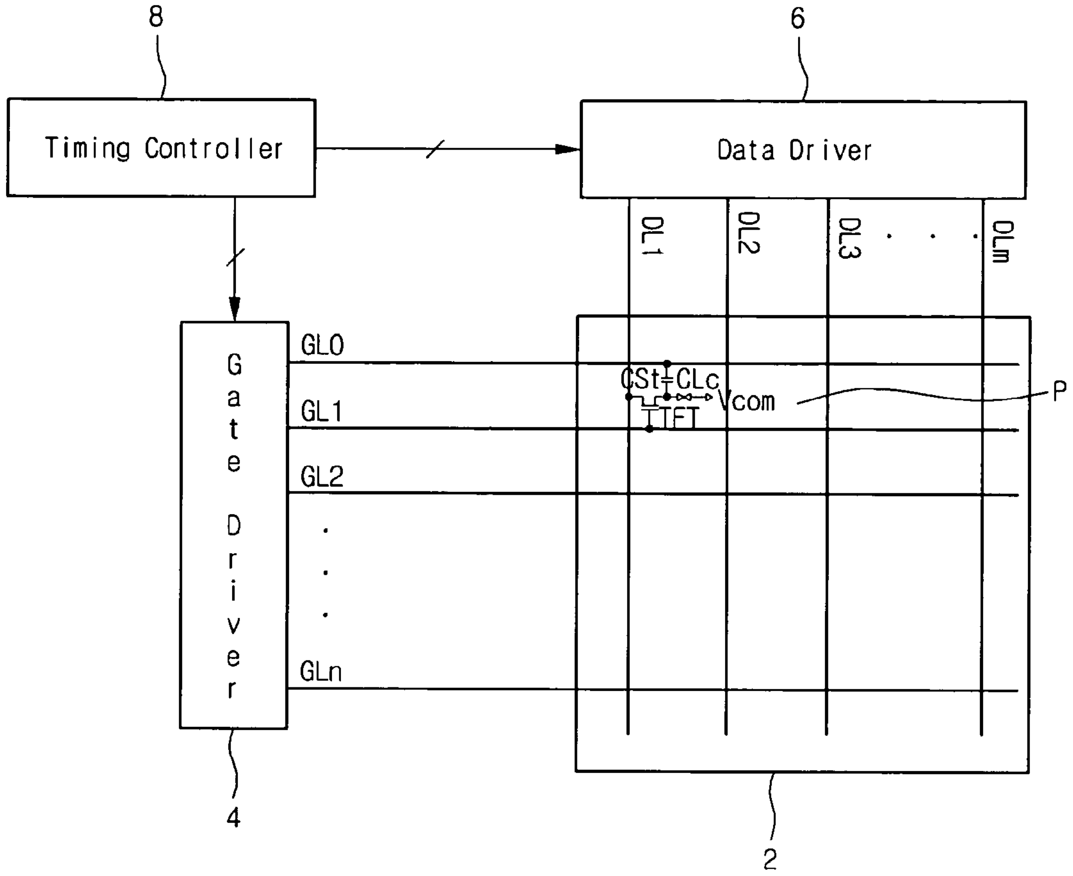
Fig.1 (Related Art)
FIG. 1 is a schematic diagram of a related art LCD.
Figure 2:
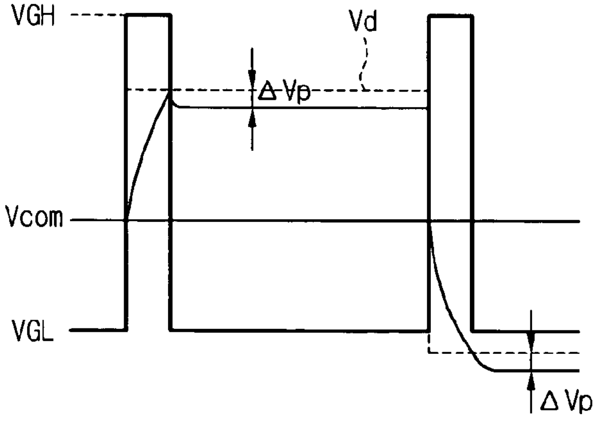
Fig.2 (Related Art)
FIG. 2 is a diagram for explaining a kickback voltage in the LCD of FIG. 1.
Figure 3:
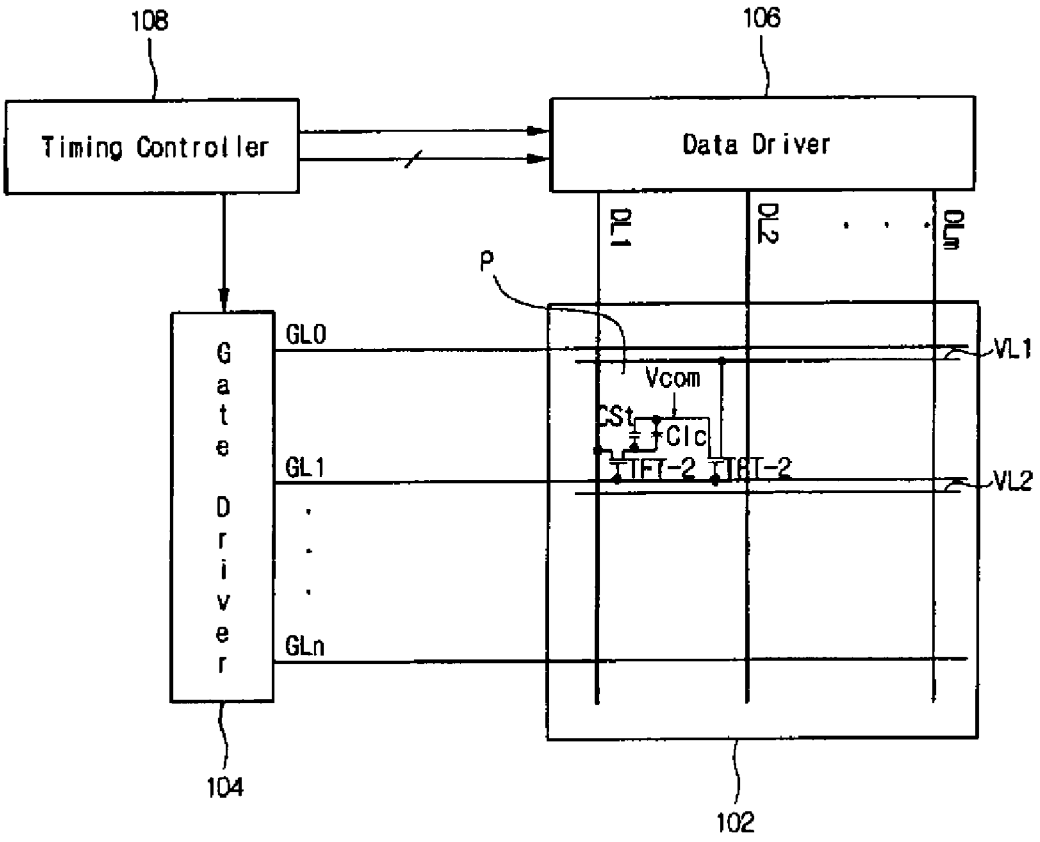
FIG. 3 is a schematic diagram of an LCD according to a first embodiment of the present invention.

FIG. 3 is a schematic diagram of an LCD with a liquid crystal panel according to a first embodiment of the present invention.

Referring to FIG. 3, the LCD includes a liquid crystal panel 102, a gate driver 104, a data driver 106, and a timing controller 108. In the liquid crystal panel 102, a plurality of gate lines GL0 to GLn and a plurality of data lines DL1 to DLm are arranged to define a plurality of pixel regions P in which images are displayed. The gate driver 104 and data driver 106 drive the gate lines GL0 to GLn and the data lines DL1 to DLm, respectively. The timing controller 108 controls the gate driver 104 and the data driver 106.

The description of the parts of the LCD shown in FIG. 3 that are identical to those of the related art LCD will be omitted for conciseness.

In the liquid crystal panel 102, the pixel regions P are defined by the data lines GL0 to GLn and the data lines DL1 to DLm, and common voltage lines VL1, VL2, . . . are arranged in parallel to the gate lines GL0 to GLn. First and second TFTs TFT-1 and TFT-2 serving as a switching element and pixel electrodes (not shown) connected to the first TFT TFT-1 are formed at the crossing of the gate lines GL0 to GLn and the data lines DL1 to DLm.

The pixel electrodes overlap the common voltage lines VL1, VL2, . . . to form storage capacitors Cst.

The first and second TFTs TFT-1 and TFT-2 are connected to the gate lines GL1 to GLn, are turned on in response to scan signals (i.e., a gate high voltage VGH) supplied through the gate lines GL1 to GLn, and turned off in response to a gate low voltage VGL.

The first TFTs TFT-1 are connected to the pixel electrodes. The pixel electrodes overlap the common voltage lines VL1, VL2, . . . to form storage capacitors Cst.

Also, the liquid crystal panel 102 includes a first substrate, a second substrate, and a liquid crystal layer disposed therebetween.

Figure 4:
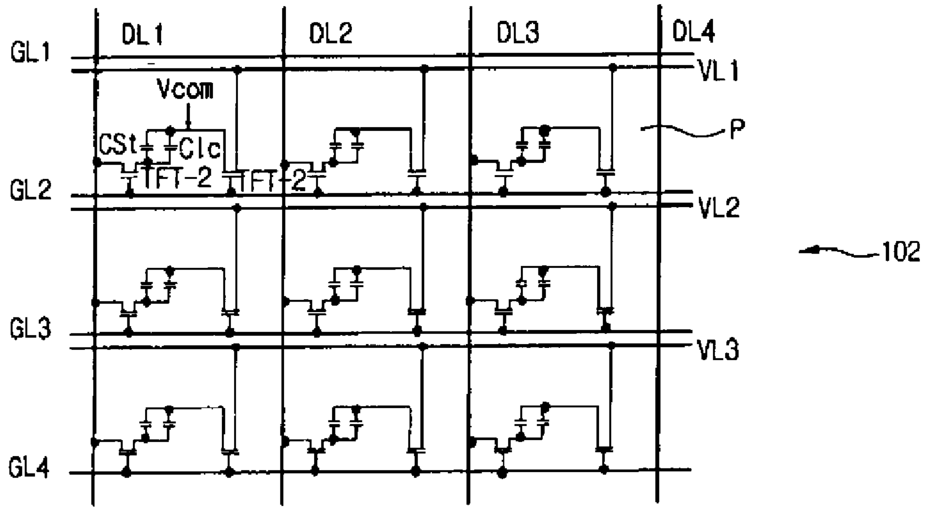
FIG. 4 is a circuit diagram illustrating a part of a liquid crystal panel illustrated in FIG. 3.

FIG. 4 is a circuit diagram illustrating a part of the liquid crystal panel of FIG. 3.

Referring to FIGS. 3 and 4, the liquid crystal panel 102 includes first to fourth gate lines GL1 to GL4 and first to fourth data lines DL1 to DL4 defining a plurality of pixel regions P. Also, first to third common voltage lines VL1 to VL3 are arranged in parallel to the first to fourth gate lines GL1 to GL4.

In the pixel region P, first and second TFTs TFT-1 and TFT-2 are formed. The first TFT TFT-1 is connected to a pixel electrode (not shown), and the second TFT TFT-2 is connected to a common electrode (not shown) and the common voltage lines VL1 to VL3. The pixel electrode overlaps the first to third common voltage lines VL1 to VL3 to form a storage capacitor Cst.

The first to third common voltage lines VL1 to VL3 are supplied with a common voltage Vcom that is a reference voltage for driving the liquid crystal.

The first and second TFTs TFT-1 and TFT-2 are electrically connected to the second to fourth gate lines GL2 to GL4. When the gate high voltage VGH is supplied to the second to fourth gate lines GL2 to GL4, the first and second TFTs TFT-1 and TFT-2 are turned on.

When the gate high voltage is supplied from the gate driver 104 to the second gate line GL2, the first and second TFTs TFT-1 and TFT-2 of each pixel region P on the second gate line GL2 are turned on. Therefore, the data voltage supplied from the data driver 106 to the first to fourth data lines DL1 to DL4 is supplied to the pixel electrode of each pixel region P attached to GL2 through the first TFT TFT-1 of each pixel P. Simultaneously, the common voltage supplied to the first to third common voltage lines VL1 to VL3 is supplied to the common electrode of the each pixel region P through the second TFT TFT-2 of each pixel region P.

Figure 5:
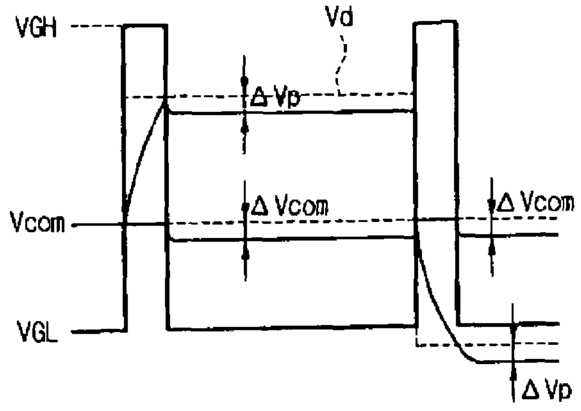
FIG. 5 is a diagram for explaining a kickback voltage in the LCD of FIG. 3.

When the gate low voltage is supplied from the gate driver 104 to the second gate line GL2, the first and second TFTs TFT-1 and TFT-2 of each pixel region P on the second gate line GL2 is turned off. In this case, any data voltage and any common voltage are not supplied to the pixel electrode and the common voltage of the pixel region P on the second gate line GL2. When the voltage changes from the gate high voltage to the gate low voltage, the data voltage charged at the pixel electrode is dropped by the kickback voltage ($\Delta$Vp) due to a parasitic capacitance Cgs between the gate electrode and the source electrode of the first TFT TFT-1 connected to the pixel electrode, as shown in FIG. 5. Likewise, because a parasitic capacitance Cgs exists between the gate and source of the second TFT TFT-2, the common voltage applied to the common electrode is dropped by the kickback voltage ($\Delta$Vcom). At this point, it can be seen from Eq. (1) that the kickback voltage ($\Delta$Vp) of the data voltage is almost equal to the kickback voltage ($\Delta$Vcom) of the common voltage. Because the common voltage is dropped by the kickback voltage ($\Delta$Vcom) as much as the data voltage charged at the pixel electrode is dropped by the kickback voltage ($\Delta$Vp). The potential difference between the data voltage and the common voltage is equal to the case where the kickback voltage does not occur, thereby preventing the flicker or image-sticking.

Likewise, on other gate lines GL3 to GL4, the common voltage is dropped by the kickback voltage ($\Delta$Vcom) as much as the data voltage is dropped by the kickback voltage ($\Delta$Vp), thereby preventing the flicker or image-sticking.

According to the first embodiment of the present invention, the first and second TFTs TFT-1 and TFT-2 are provided in each pixel region and the common voltage as well as the data voltage has the kickback voltage, thereby preventing the flicker or image-sticking.

In this embodiment, however, two TFTs TFT-1 and TFT-2 are present and thus the aperture ratio is relatively decreased compared with the case where one TFT is present.

To solve this problem, a liquid crystal panel according to a second embodiment of the present invention is provided.

Figure 6:
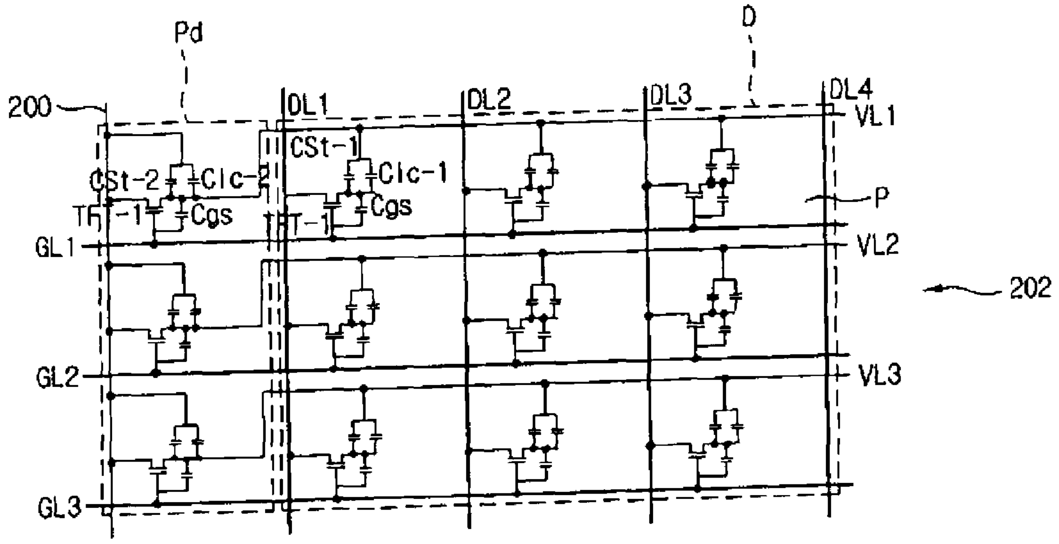
FIG. 6 is a circuit diagram illustrating a part of the liquid crystal panel according to a second embodiment of the present invention.

FIG. 6 is a circuit diagram illustrating a part of the liquid crystal panel according to a second embodiment of the present invention.

Referring to FIG. 6, the liquid crystal panel 202 is divided into a display region D and a non-display region. The display region D is a region in which an image is displayed and the non-display region is a region in which an image is not displayed. The liquid crystal panel 202 may include the timing controller 108, the gate driver 104, and the data driver 106, as illustrated in FIG. 3. Because the timing controller 108, the gate driver 104, and the data driver 106 are the same as those of FIG. 3, their detailed description will be omitted.

The display region D includes a plurality of pixel regions P arranged in a matrix.

In the display region D, first to third gate lines GL1 to GL3 are arranged in a horizontal direction, and first to fourth data lines DL1 to DL4 are arranged in a vertical direction, intersecting the first to third gate lines GL1 to GL3. Also, first to third common voltage lines VL1 to VL3 are horizontally arranged in parallel to the first to third gate lines GL1 to GL3.

The first to third common voltage lines VL1 to VL3 may be formed using the same process as that of the first to third gate lines GL1 to GL3 and at the same time.

The liquid crystal panel includes a first substrate, a second substrate, and a liquid crystal layer interposed therebetween. For example, the first to third gate lines GL1 to GL3, the first to fourth data lines DL1 to DL4, and the first to third common voltage lines VL1 to VL3 may be formed on the first substrate. The first substrate and the second substrate are attached to face each other. R, G, and B color filters may be formed on the second substrate.

The gate lines GL1 to GL3 and the data lines DL1 to DL4 define a plurality of pixel regions P. That is, one gate line and one data line cross to define one pixel region. Therefore, a plurality of gate lines and a plurality of data lines define a plurality of pixel regions arranged in a matrix.

In each pixel region P, a first TFT TFT-1 is connected to the gate line and the data line, and a pixel electrode (not shown) is connected to the first TFT TFT-1. Also, common electrodes connected to the common voltage lines VL1 to VL3 may be arranged in the pixel regions P. Accordingly, the first TFT and the pixel electrode are formed in the pixel regions P included in the display region D.

A gate pad region Pd and a data pad region (not shown) may be formed in the non-display region. The gate pad region Pd is a region where a gate pad for connecting the gate lines GL1 to GL3 of the display region D to the gate driver (see FIG. 3) is formed, and the data pad region is a region where a data pad for connecting the data lines DL1 to DL4 of the display region D to the data driver (see FIG. 3) is formed.

Second TFTs TFT-2 connected to the gate lines GL1 to GL3 may be formed in the gate pad region Pd. Although the second TFT TFT-2 may be formed in the data pad region, it is more preferable that the second TFT TFT-2 be formed in the gate pad region Pd. The second TFT TFT-2 is a switch for applying the common voltage to the common voltage lines VL1 to VL3 of the display region D.

The gate pad region Pd will be described in more detail. A dummy common voltage line 200 is vertically arranged in parallel to the first to fourth data lines DL1 to DL4 of the display region D.

The second TFT TFT-2 is connected to the first to third gate lines GL1 to GL3 and the first to third common voltage lines VL1 to VL3. In other words, the second TFTs TFT-2 are connected to the first gate line GL1 and the first common voltage line VL1, the second gate line GL2 and the second common voltage line VL2, and the third gate line GL3 and the third common voltage line VL3. In this case, the dummy common voltage 200 is commonly connected to each second TFT TFT-2. Therefore, the common voltage is always applied to the dummy common voltage line 200, and the common voltage is supplied to the common voltage line in the display region D when the second TFT TFT-2 is turned on by the gate line to which the scan signal is supplied. Consequently, the common voltage supplied to the common voltage line may be applied to the common electrode of the corresponding pixel region D.

For example, when the scan signal is applied to the first gate line GL1, the second TFT TFT-2 is turned on in response to the scan signal. Therefore, the common voltage on the dummy common voltage line 200 may be supplied to the first common voltage line VL1 of the display region D through the turned-on second TFT TFT-2. Consequently, the common voltage is applied to the common electrode of the pixel region P arranged on the first gate line GL1.

The dummy common voltage line 200 may be formed through the same process as that of the first to fourth data lines DL1 to DL4 and at the same time.

The first and second TFTs TFT-1 and TFT-2 are simultaneously turned on/off in response to the gate high voltage VGH and the gate low voltage VGL supplied to the first to third gate lines GL1 to GL3.

When the gate high voltage VGH is supplied to any one of the first to third gate lines GL1 to GL3, the second TFT TFT-2 formed in the gate pad region Pd is turned on. The common voltage Vcom supplied to the dummy common voltage line 200 is supplied through the second TFT TFT-2 to the corresponding common voltage line of the display region D connected to the second TFT TFT-2. Finally, the common voltage Vcom is supplied to the common electrode of each pixel region P. Simultaneously, the first TFT TFT-1 of the display region D is turned on, so that the data voltages supplied through the first to fourth data lines DL1 to DL4 are applied through the first TFT TFT-1 to the pixel electrodes of each pixel P on the corresponding gate line.

The common voltage supplied to the dummy common voltage line 200 is not simultaneously supplied to the first to third common voltage lines VL1 to VL3 of the display region D, but supplied only when the first TFTs TFT-1 on the gate lines GL1 to GL3 are turned on. For example, when the scan signal is supplied to the first gate line GL1, only the second TFT TFT-2 connected to the first gate line GL1 is turned on. Therefore, the common voltage is supplied to only the first common voltage line VL1 of the display region D.

The second TFT TFT-2 has the same capacity as that of the first TFT TFT-1. That is, the first and second TFTs TFT-1 and TFT-2 are influenced by the parasitic capacitance Cgs between the gate electrode and the source electrode, the storage capacitance Cst, and the liquid crystal capacitance Clc.

Due to these capacitances, the data voltage passing through the first TFT TFT-1 and the common voltage passing through the second TFT TFT-2 are dropped by the kickback voltage. In this case, the first and second TFTs TFT-1 and TFT-2 are influenced by the same capacitances, and thus the kickback voltages also become substantially equal. That is, the kickback $\Delta Vp$ dropped from the data voltage passing through the first TFT TFT-1 is equal to the kickback voltage $\Delta Vcom$ dropped from the common voltage passing through the second TFT TFT-2.

A waveform of the kickback is illustrated in FIG. 5.

It will be assumed that the data voltage of a positive polarity and the data of a negative polarity are supplied in each frame and have the same gray scale values. As illustrated in FIG. 5, the data voltage is dropped by the kickback voltage $\Delta Vp$ regardless of the polarity. Also, the common voltage is dropped by the kickback voltage $\Delta Vcom$ in each frame. Therefore, the potential difference between the data voltage of the positive polarity and the common voltage in the first frame is equal to that between the data voltage of the negative polarity and the common voltage in the second frame. Thus, the kickback voltage $\Delta Vp$ dropped from the data voltage in each frame is offset by the kickback voltage $\Delta Vcom$ dropped from the common voltage, thereby preventing the flicker and image-sticking.

Consequently, the second embodiment of the present invention can prevent the flicker and image-sticking and minimize the number of TFTs disposed in each pixel region, thereby improving the aperture ratio.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display device comprising:

a display region in which a plurality of pixel regions are arranged in a matrix, each of the pixel regions including:

a gate line and a data line crossing one another;

a common voltage line arranged in parallel to the gate line;

a first thin film transistor connected to and formed at the crossing of the gate line and the data line;

a pixel electrode connected to the first thin film transistor and formed at the crossing of the gate line and the data line to display an image corresponding to a data voltage provided from the data line through the first thin film transistor;

a common electrode connected to the common voltage line for forming an electric field with the pixel electrode; and a non-display region outside the display region including a gate pad region formed at an end portion of each gate line and a data pad region formed at an end portion of the data line, wherein each gate pad region includes a dummy pixel, the dummy pixel is configured with the same circuit as the pixel region, the dummy pixel includes a second thin film transistor directly connected to the gate line and the common voltage line, respectively, wherein the second thin film transistor is a switch element for applying a common voltage to the common voltage line of the pixel region, wherein the gate pad region includes a dummy common voltage line arranged in parallel to the data line and connected to the second thin film transistor, wherein the dummy common voltage line is connected to the common electrodes of the display region, the common voltage supplied to the dummy common voltage line is supplied to the common electrodes of the display region when the second thin film transitor is turned on, wherein the data voltage charged at the pixel electrode drops by an amount equal to a kickback data voltage caused by a parasitic capacitance of the first thin film transistor, wherein the common voltage charged at the common electrode drops by an amount equal to a kickback common voltage caused by a parasitic capacitance of the second thin film transistor, wherein the second thin film transistor has substantially the same capacitance as that of the first thin film transistor, wherein the first thin film transistor has substantially the same parasitic capacitance as that of the second thin film transistor, wherein the kickback data voltage dropped from a data voltage passing through the first thin film transistor is substantially equal to the kickback common voltage dropped from the common voltage passing through the second thin film transistor, wherein the first and second thin film transistors are simultaneously switched by a scan signal supplied to the gate line.

2. The liquid crystal display device according to claim 1, wherein the common voltage line and the gate line are simultaneously formed.

3. The liquid crystal display device according to claim 1, wherein the number of the second thin film transistors is equal to that of the gate lines.

4. The liquid crystal display device according to claim 1, wherein a predetermined data voltage is applied to the pixel electrode by the switching of the first thin film transistor, and a predetermined common voltage is applied through the common voltage line to a common electrode by the switching of the second thin film transistor.

5. A liquid crystal display device comprising:
- a display region in which a plurality of pixel regions are arranged in a matrix;
- a plurality of gate lines arranged in a first direction;
- a plurality of data lines arranged in a second direction and crossing the gate lines;
- a plurality of first common voltage lines arranged in parallel to the gate lines;
- a plurality of first thin film transistors connected to the gate lines and the data lines;
- a plurality of pixel electrodes connected to the first thin film transistors and formed at the crossing of the gate lines and the data lines to display images corresponding to a plurality of data voltages provided from the data lines through the first thin film transistors;
- a plurality of common electrodes connected to the plurality of first common voltage lines for forming an electric field with the plurality of pixel electrodes;
- a plurality of second thin film transistors directly connected to the gate lines, common electrodes, and the first common voltage lines, respectively; and
- a second common voltage line arranged in parallel to the data lines and commonly connected to the second thin film transistors,
- wherein the second thin film transistors and the second common voltage line are formed in a gate pad region of the non-display region, the gate pad region includes a plurality of dummy pixels, each of the dummy pixels is configured with the same circuit as each of the pixel regions,
- wherein each pixel region includes:
  - one of the plurality gate lines;
  - one of the plurality of data lines;
  - one of the plurality of first common voltage lines;
  - one of the plurality of thin film transistors;
  - one of the plurality of pixel electrodes;
  - one of the plurality of common electrodes;
- wherein each dummy pixel includes one of the plurality of second thin film transistors, wherein the second thin film transistors are switch elements for applying a common voltage to the first common voltage lines of the pixel regions
- wherein the second common voltage line of the gate pad region is connected to the common electrodes of the display region, the common voltage supplied to the second common voltage line is supplied to the common electrodes when the second thin film transistors are turned on,
- wherein the data voltages charged at the pixel electrodes drop by an amount equal to a kickback data voltage caused by a parasitic capacitance of the first thin film transistors,
- wherein the common voltages charged at the common electrodes drop by an amount equal to a kickback common voltage caused by a parasitic capacitance of the second thin film transistors,
- wherein the second thin film transistors have substantially the same capacitance as that of the first thin film transistors,
- wherein the first thin film transistors have substantially the same parasitic capacitance as that of the second thin film transistors,
- wherein the kickback data voltage dropped from the data voltages passing through the first thin film transistors is substantially equal to the kickback common voltage dropped from the common voltages passing through the second thin film transistors,
- wherein the first and second thin film transistors are simultaneously switched by a scan signal supplied to the gate lines.

6. The liquid crystal display device according to claim 5, wherein the plurality of first common voltage lines and the gate lines are simultaneously formed.

7. The liquid crystal display device according to claim 5, wherein the number of the second thin film transistors is equal to that of the gate lines.

8. The liquid crystal display device according to claim 5, wherein a predetermined data voltage is applied to the pixel electrodes by the switching of the first thin film transistors, and a predetermined common voltage is applied through the second common voltage lines to the plurality of first common lines by the switching of the second thin film transistors.

9. A method for driving a liquid crystal display device, the liquid crystal display device including a display region comprising a plurality of pixel regions, a plurality of gate lines arranged in a first direction, a plurality of data lines arranged in a second direction and crossing the plurality of gate lines, a plurality of first common voltage lines arranged in parallel to the plurality of gate lines, a plurality of first thin film transistors connected to the plurality of gate lines and the plurality of data lines, respectively, a plurality of pixel electrodes connected to the first thin film transistors, respectively, a plurality of common electrodes connected to the first common voltage lines, respectively, and a plurality of second thin film transistors directly connected to the plurality of gate lines and the first common voltage lines, respectively, the method comprising:
- supplying a scan signal to the plurality of gate lines;
- switching the first and second thin film transistors disposed on the plurality of gate lines according to the scan signal;
- applying a data voltage, which is supplied to the data line, through the first thin film transistor to the pixel electrode; and
- applying a common voltage through the second thin film transistor and the first common voltage line to the common electrode,
- wherein the second thin film transistors are formed in a non-display gate pad region,
- wherein the non-display gate pad region includes a plurality of dummy pixels, each of the plurality of dummy pixel is configured with the same circuit as each of the pixel regions,
- wherein each pixel region includes:
  - one of the plurality gate lines;
  - one of the plurality of data lines;
  - one of the plurality of first common voltage lines;
  - one of the plurality of thin film transistors;
  - one of the plurality of pixel electrodes;
  - one of the plurality of common electrodes;
- wherein each dummy pixel includes one of the plurality of second thin film transistors, wherein the second thin film transistors are switch elements for applying the common voltage to the first common voltage lines of the pixel regions, wherein the non-display gate pad region includes a dummy common voltage line arranged in parallel to the plurality of data lines and connected to the second thin film transistors, wherein the dummy common voltage line of the non-display gate pad region is connected to the common electrodes of the display region, the common voltage supplied to the dummy common voltage line is supplied to the common electrodes of the display region when the second thin film transistors are turned on, wherein the data voltage charged at the pixel electrode drops by an amount equal to a kickback data voltage caused by a parasitic capacitance of the first thin film transistor, wherein the common voltage charged at the common electrode drops by an amount equal to a kickback common voltage caused by a parasitic capacitance of the second thin film transistor, wherein the second thin film transistor has substantially the same capacitance as that of the first thin film transistor, wherein the first thin film transistor has substantially the same parasitic capacitance as that of the second thin film transistor, wherein the kickback data voltage dropped from a data voltage passing through the first thin film transistors is substantially equal to the kickback common voltage dropped from the common voltage passing through the second thin film transistors, wherein the first and second thin film transistors are simultaneously switched by a scan signal supplied to the plurality of gate lines, wherein the plurality of pixel electrodes is formed at the crossing of the gate lines and the data lines to display images corresponding to a data voltages provided from the data lines through the first thin film transistors, wherein the plurality of common electrodes forms an electric field with the plurality of pixel electrodes.

* * * * *